United States Patent [19]
Tokuyama et al.

[11] Patent Number: 5,223,998
[45] Date of Patent: Jun. 29, 1993

[54] MAGNETIC HEAD SLIDER UNIT HAVING A FLOAT SLIDER AND MAGNETIC HEAD MOUNTED THEREON FOR CONTACT MAGNETIC RECORDING

[75] Inventors: Mikio Tokuyama; Yuzo Yamaguchi, both of Tsuchiura, Japan

[73] Assignee: Hitachi Ltd., Tokyo, Japan

[21] Appl. No.: 944,308

[22] Filed: Sep. 14, 1992

Related U.S. Application Data

[63] Continuation of Ser. No. 647,759, Jan. 30, 1991, abandoned.

[30] Foreign Application Priority Data

Feb. 2, 1990 [JP] Japan ................................ 2-23752
Apr. 16, 1990 [JP] Japan ................................ 2-97663

[51] Int. Cl.$^5$ .............................................. G11B 5/60
[52] U.S. Cl. ................................................... 360/103
[58] Field of Search ................................. 360/103, 104

[56] References Cited

U.S. PATENT DOCUMENTS

| | | | |
|---|---|---|---|
| 3,149,337 | 9/1964 | Sliter | 360/103 |
| 4,605,977 | 8/1986 | Matthews | 360/102 X |
| 4,998,174 | 3/1991 | Wada | 360/103 |

FOREIGN PATENT DOCUMENTS

63-306514 12/1988 Japan ................................ 360/103

Primary Examiner—A. J. Heinz
Attorney, Agent, or Firm—Antonelli, Terry, Stout & Kraus

[57] ABSTRACT

A magnetic head slider unit has a slider which is mounted so as to be movable relative to a magnetic medium such as a magnetic disk. The slider is shaped so as to generate an air pressure higher than ambient pressure between itself and the disk. A magnetic head for reading and/or writing data to the disk mounted on a movable member movable in a bore in the slider. In this way, the head may follows changes in the surface of the disk, by movement of the movable member in the bore, without inertial forces of the slider being transmitted to the disk. The movable member may be biased towards the magnetic disk by, for example, a spring, or creating a region of reduced pressure adjacent the movable member. Alternatively, the magnetic head may be mounted on a flexible arm.

28 Claims, 8 Drawing Sheets

MAGNETIC HEAD SLIDER UNIT HAVING A FLOAT SLIDER AND MAGNETIC HEAD MOUNTED THEREON FOR CONTACT MAGNETIC RECORDING

This is a continuation of application Ser. No. 647,759, filed Jan. 30, 1991, now abandoned.

BACKGROUND OF THE INVENTION

1. Field of the Invention

The present invention relates to a magnetic head slider unit for reading or writing data to/or from a magnetic medium, such as a magnetic disk and to a magnetic disk apparatus incorporating such a magnetic head slider unit.

2. Summary of the Prior Art

In order to read or write data to/or from a magnetic medium such as a magnetic disk, it has been proposed to mount a magnetic head on a slider, which slider is movable over the surface of the disk. The slider is shaped so as to form an air film between its surface adjacent the disk (hereinafter called the "float surface"), and the adjacent surface of the magnetic disk. That air film ensures that the slider maintains a distance of less than 1 micron, which distance is generally referred to as the "float distance" an example of such a magnetic head slider unit is disclosed in, for example, U.S. Pat. No. 3,823,416 (equivalent to JP-B-57-569).

Although the float distance is small, it is very important that the slider does not contact the disk itself while it is moving. If this were to happen, irrepairable damage could be caused to the disk.

In U.S. Pat. No. 3,823,416, the magnetic head is fixed to the trailing edge of the slider, and so must necessarily also remain clear of the surface of the magnetic disk when the slider is moving relative thereto.

JP-A-62-250570 proposes an arrangement in which the magnetic head is connected to the slider by a piezoelectric actuator, with the actuator being deformable under the influence of electric current to move the head relative to the slider. However, it can readily be appreciated that such an actuator cannot respond to very rapid changes in the float distance.

Although, magnetic disks are made so that their surfaces are as smooth as possible, there is inevitably some surface roughness of the disk surface, and there may be more substantial disk deformation caused by air movement. Such roughness and disk deformation imposes a practical limit on the permissible float distance between the slider and the disk. On the other hand, the spacing between the head and the disk affects the capacity of the apparatus to read and write data. In order to increase the capacity, it is desirable for the spacing between the head and the disk to be reduced, preferably to zero. If, however, the magnetic head of the slider unit disclosed in U.S. Pat. No. 3,823,416 or JP-A-62-250570 were to be brought into contact with the disk when the slider was moving relative to the disk, then the disk would be damaged. In order to compensate for, for example, surface roughness, the magnetic head must move, but in the arrangements of U.S. Pat. No. 3,823,416 and JP-A-62-250570, such movement has an inertia corresponding to the whole of the slider unit. Thus, rapid movement is not possible and the magnetic head will then cause a significant force to be applied to the disk when roughness is encountered.

U.S. Pat. No. 4,819,091 sought to achieve an arrangement in which the magnetic head was in contact with the disk and, for this purpose, the slider is dispensed with, and instead the magnetic head is formed as part of a single crystal. The single crystal has the advantage of high thermal conductivity, a low coefficient of friction and a high surface energy. The crystal could be, for example, the 110 crystal plane of diamond. However, it is believed that it is still not possible to make such a single crystal mounting for the magnetic head which will not cause damage to the disk if there is disk roughness.

Therefore, it is necessary to find some way of permitting the head to contact the surface of the disk, and yet allow that head to move to compensate for, for example, surface roughness of the disk without requiring the whole of the slider to move JP-A-63-306514 attempts to address this problem, and will be discussed in more detail later. An article in IEICE Technical Report Vol 89, No 29, MR89-4, published in Japanese by the Institute of Electronics, Information and Communication Engineers and partially republished in "Intermag 90", the 1990 Digests of the Intermay Conference in an article entitled "Recording Characteristics of Perpendicular Magnetic Rigid Disk Measured by Non-Flying Single-Pole Head" by Y. Nakamura et al, on paper FQ-05 will also be discussed. This article will be referred to as "Report MR89-4".

SUMMARY OF THE INVENTION

Before considering the present invention in detail, it is first important to understand the factors which affect the forces applied to the magnetic disk when contact occurs. Consider first the case where the magnetic head is fixed to the slider as in U.S. Pat. No. 3,823,416.

If the magnetic head comes into contact with the magnetic disk surface for some reason or other, the impact force (damage) which the magnetic disk surface receives is determined by both the inertial force (mass) of the head and also the inertial force of the slider. Thus, the impact force D which the disk receives due to contact is approximated by the following equation:

$$D = C \cdot (m_S + m_R) \cdot U \quad (1)$$

where: $m_S$ and $m_R$ are the masses of the slider and head, respectively, U is a peripheral speed of the disk, D is the impact force applied to the disk due to contact and C is a constant.

As described already;

$$m_S >> m_R$$

Hence, Formula (1) can be approximated as follows:

$$D = C \cdot m_S \cdot U \quad (2)$$

In other words, the magnetic disk receives the impact force of the magnitude of Formula (1) above.

The high speed magnetic disk contact recording system disclosed in U.S. Pat. No. 4,819,091 does not consider the damage of the magnetic disk due to the slider inertia force at the time of the sliding contact between the slider and the disk come into mutual contact, the impact force by the inertia force (mass) of the slider acts on the magnetic disk. This impact force D is expressed by Formula (1) above. Furthermore, the system of U.S. Pat. No. 4,819,091 imposes limitations on the material used, in that a material made of a single crystal and having a high heat conductivity, low coefficient of friction and high surface energy must be used for the sliding surface between the slider and the magnetic disk.

Therefore, it is desirable to de-couple the magnetic head from the slider, so that the inertial effects of the slider do not dominate the forces which are exerted on the magnetic disk.

JP-A-63-306514 goes some way to achieving this. In that document, it is proposed that the magnetic head be fixed to one end of a flexible member, with the other end of which is being fixed to the slider. The flexible member then allows the head to move relative to the slider. Thus, if the surface roughness of the disk causes the magnetic head to move, that movement can be relatively free with the flexible member deforming to permit such free movement. Little or no inertial force is transmitted from the slider to the disk via the flexible member.

However, the applicants have appreciated that such an arrangement is not satisfactory. The arrangement may work satisfactorily for movement generally perpendicular to the plane of the disk. However, the flexible member will also allow the magnetic head to move, at least over a limited range, parallel to the plane of, the disk and such movement is wholly unacceptable.

Therefore, a first aspect of the present invention proposes that the magnetic head form part or all of a movable member mounted in a bore of the slider, with the part of the movable member projecting from the bore and a part being retained within the bore. The movable member is then axially movable in that bore.

With such a magnetic head slider unit, the slider can slide over the magnetic member, such as, for example, a magnetic disk and maintain a suitable spacing therefrom. The movable member projects from the bore so that the magnetic head is in contact with the magnetic member. If there are changes in the shape of the magnetic member due to, for example, surface roughness, these can be absorbed by the movable member moving axially in the bore into and out of the slider. However, since such movement is substantially free, the slider exerts little or no inertial force on the disk. On the other hand, since a part of the movable member is held within the bore, the movable member cannot move laterally, since such movement is restricted by the walls of the bore.

Thus, returning to Formula (1), if little or no inertial force is applied to the head from the slider:

$$m_R > > m_S$$

Hence, Formula (1) can be approximated as follows:

$$D = C \cdot m_2 \cdot U \qquad (3)$$

Thus, the impact force D exerted by a magnetic head slider unit according to the present invention of a magnetic member is significantly reduced relative to the prior art arrangement.

For simplicity, the bore may be formed in the float surface of the slider, so that the movable member projects directly from that float surface. However, it is also possible for the movable member to be mounted in a bore of a holder component of the slider, which holder component is mounted adjacent the float surface.

It is desirable for there to be little or no friction between the movable member and the walls of the bore when the movable member moves in the bore. One way of achieving this is to provide one or more ducts extending between the bore and the float surface. Since, as will be discussed in more detail later, there is normally a positive pressure between the float surface and the magnetic member, air will pass from the space between the float surface and the magnetic member through the duct(s) to the interior of the bore, thereby providing an air bearing between the movable member and the bore. Alternatively, a magnet may be provided extending around the inner surface of the wall of the bore, which generates a repulsive force by its interaction with a corresponding magnet extending around the movable member, so that that replusive force prevents contact between the movable member and the walls of the bore.

It is important, in the present invention, that contact is maintained between the magnetic head and the magnetic member. When the magnetic member is mounted horizontally, so that the movable member moves vertically, then it may be that the weight of the movable member may itself provide sufficient force to keep the magnetic head in contact with the magnetic medium. However if this is not the case, or if the magnetic medium is not horizontal, suitable resilient biasing means, such as a spring, may be provided in the bore to bias the movable member outwardly. Another alternative is for the float surface to be shaped so as to generate an attractive force. This will now be discussed in more detail.

In general, since it is important to maintain a separation (the float distance) between the float surface of the slider and the magnetic member, the float surface of the slider is shaped so as to generate a pressure between itself and the magnetic member which is greater than ambient pressure. The shaping of the slider to achieve this is well known and is disclosed in U.S. Pat. No. 3,823,416. However, it is also known to shape the float surface so that reduced pressure, relative to ambient pressure, is generated at a part of the slider. An example of this is disclosed in, for example, U.S. Pat. No. 3,855,625. If the float surface of the slider is shaped so that a reduced pressure is generated between the float surface and the magnetic member at the location of the movable member, then that reduced pressure will generate an attractive force between the movable member and the magnetic member, thereby holding the magnetic head in contact with the magnetic member.

The cross-sectional shape of the bore may be selected as desired. Although, a circular bore may be easiest to manufacture, other shapes such as squares, rectangles, etc., may also be used. Furthermore, the location of that bore, if it is in the float surface, may also be selected as desired. In general, in order to produce positive pressure, the float surface comprises outer float rails, with a recessed bleed surface therebetween. The bore may be in the bleed surface, or may be in the float rails themselves if desired. Furthermore, although the bore will normally extend perpendicularly to the magnetic member, again this is not essential and angled bores may be used if desired.

Report MR-89-4, referenced hereinabove, proposed an arrangement in which the magnetic head was mounted on a movable member supported in a holder above a magnetic disk, with the movable member being slidable in that holder. However, disclosure of that document was concerned with a fixed holder, and no problem arises with respect to the movement of the holder. In the present invention, in order to achieve the necessary movement, the movable member is mounted on the slider, and the present invention is concerned with improving such slider arrangements, and thus, is not concerned with fixed mountings.

The second aspect of the present invention also seeks to overcome the problem of lateral head movement in the arrangement of JP-A-63-306514. However, instead of mounting the head on a member movable axially in a bore in the slider, a second aspect of the present invention utilizes a flexible member between the magnetic head and the slider, without incurring the disadvantages of JP-A-63-306514. One proposal to achieve this is to connect both ends of the flexible member to the slider with an intermediate part of the flexible member spaced from the slider, and the magnetic head mounted on that intermediate part. Then, although the flexible member can permit the intermediate part, and hence the magnetic head, to move perpendicularly to the magnetic member, lateral movement is prevented. Alternatively, use can be made of the arrangements for creating a reduced pressure, relative to ambient pressure, which was discussed above. If such an arrangement is provided at the end of the flexible member, adjacent the magnetic head, then the reduced pressure generated around the magnetic head will assist in holding the magnetic head in contact with the magnetic member. Indeed, such a reduced pressure arrangement may also be provided when the magnetic head is mounted at an intermediate part of the flexible member, as discussed above.

The arrangement of JP-A-63-306514 has a further disadvantage in that, if the flexible member is to be sufficiently long to absorb movement of the head so that no inertial force is transmitted to the magnetic medium from the slider, then the amount of space that can be occupied by the head is very small. Therefore, the present invention further proposes that the flexible member extends beyond the slider (in plan view). Then, the size of the magnetic head is not limited, and a larger, and therefore more accurate, head may be provided.

BRIEF DESCRIPTION OF THE DRAWINGS

Embodiments of the present invention will now be described in detail, by way of example, with reference to the accompanying drawings, in which.

DETAILED DESCRIPTION

Referring now to the drawings wherein like reference numerals are used throughout the various views to designate like parts, a first embodiment of a magnetic head slider unit will be described with reference to FIGS. 1 to 7.

Figure 1:
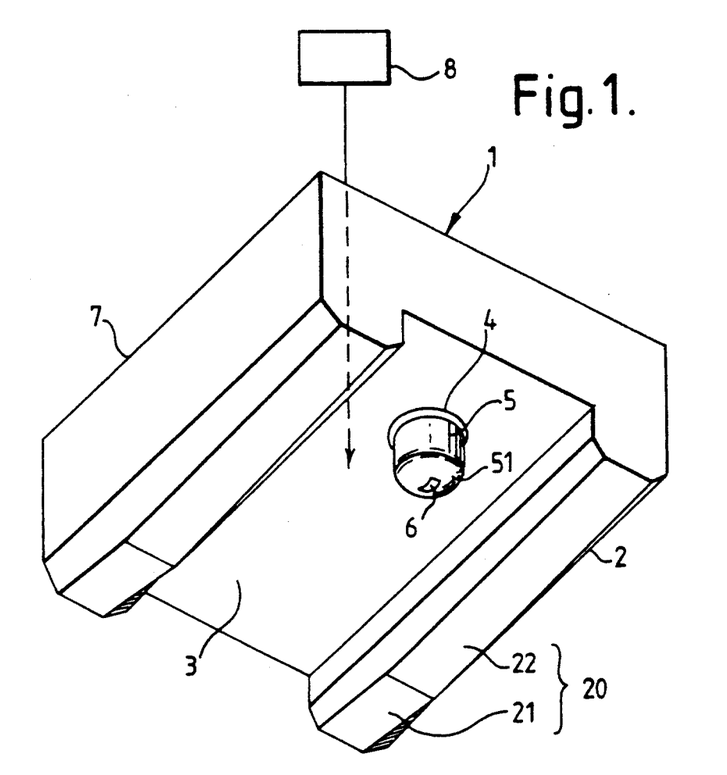
FIG. 1 is a perspective view showing a magnetic head slider unit in accordance with a first embodiment of the present invention.

As shown in FIG. 1, a slider 1 moves relative to a magnetic disk and forms an air film. The surface of the slider 1 adjacent the magnetic disk is the slide surface and that surface has two float rails 2 for generating buoyance. These float rails 2 extend in parallel in the longitudinal direction of the slider 1. The outer surface 20 of each float rail 2 consists of a taper portion 21 and a flat surface portion 22. The portion of the slide surface between the two float rails 2 is recessed and has a greater spacing from the magnetic disk surface than that of the flat surface portion 22. This is called the "bleed surface" 3.

A bore 4, extending substantially perpendicularly to the flat surface portion 22, is disposed in the bleed surface 3. A movable member 5, movable in a direction substantially perpendicular to the float surface, is located in this bore 4, with a part of the movable member 5 projecting from the slide surface and a part held within the bore 4. There is a magnetic head 6 at the end of a hemi-spherical portion 51 of the movable member 5 adjacent the magnetic disk. FIG. 1 shows the magnetic head 6 as a separate component. However, the magnetic head 6 may be formed integrally with the movable member, for example, with all the movable member 5 being of magnetic head material.

Figure 2:
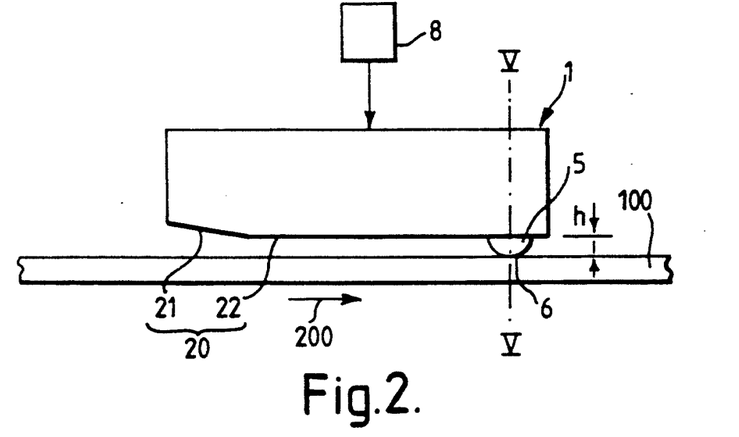
FIG. 2 is a view showing the slider operation state at the time of rotation of a magnetic disk.

A support mechanism 8 for applying a load force to the slider 1 without limiting the motion of the slider 1 is disposed on the back of the slider 1 on the opposite side to the float surface. This support mechanism 8 applies a load force that pushes the slider 1 from the back 7 of the slider 1 towards the float surface (that is, towards the magnetic disk surface) without motion of the slider 1 such as pitching, rolling and yawing. The operating state of the magnetic disk apparatus, that is, the relationship between the slider 1 and the magnetic disk 100 in the present invention at the time of rotation of the disk, is shown in FIG. 2. The flat surface portion 22 of the slider 1 floats while forming an air film between it and a magnetic surface of the rotating magnetic disk 100 and while maintaining a very small gap h (which is generally referred to as the "float distance") therebetween. The magnetic head 6 disposed at the end of the movable member 5 projects from the flat surface 22 of the slider 1 towards the magnetic disk 100. In FIG. 2, arrow 200 represents the direction of rotation of the magnetic disk 100. When the magnetic disk is halted, the flat surface portion 22 of the float surface is in contact with the magnetic disk surface, as is the magnetic head 6.

Figure 3:
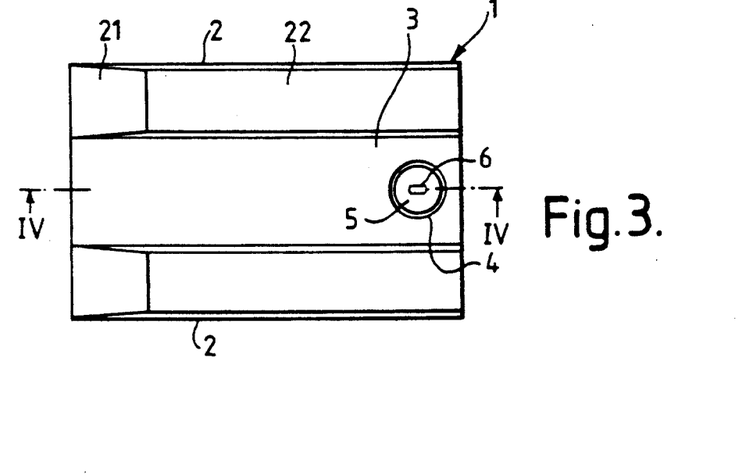
FIG. 3 is a front view of the disk when viewed from the float surface of the slider.

As shown in FIG. 3, the float rails 2, which are substantially parallel to each other, can be seen on the float surface of the slider, extending in the longitudinal direction, and the bore 4 is located at a central position between the two float rails 2. The movable member 5 is capable of moving substantially orthogonally to the flat surface portion 22 of the float surface.

Figure 4:
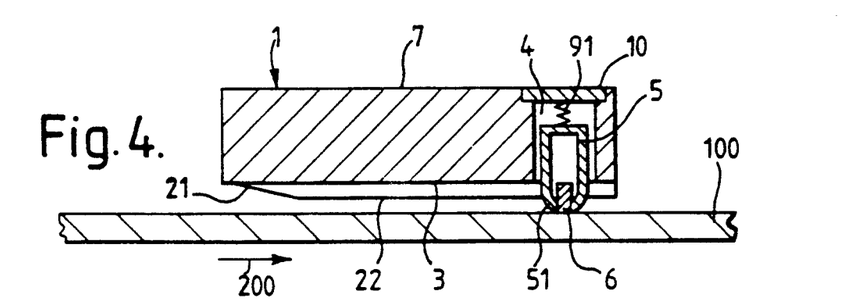
FIG. 4 is a sectional view taken along line IV—IV in FIG. 3.
Figure 5:
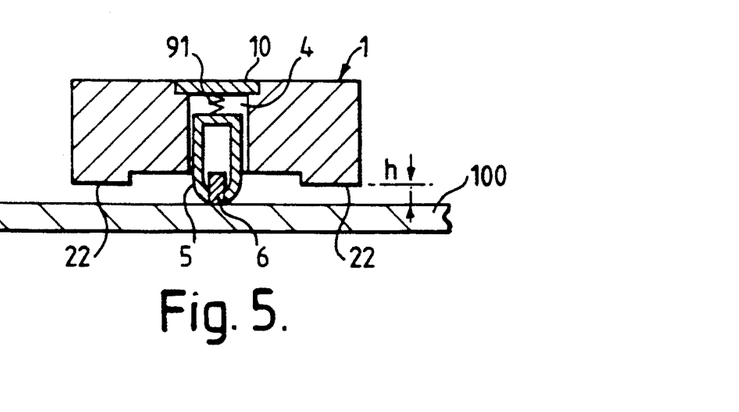
FIG. 5 is a sectional view taken along line V—V in FIG. 2.

FIG. 4 shows the contact that exists between the surface magnetic disk 100 and the magnetic head 6 during the operation of the magnetic disk 100. The cylindrical bore 4, which is substantially perpendicular to the flat surface portion 22 of the float rails 2, is located in the bleed surface 3 of the slider 1 and the movable member 5, capable of moving substantially vertically to the flat surface portion 22 of the slider 1, is in the bore 4. The end of the movable member 5, adjacent the magnetic disk surface 100, is in the form of a hemi-spherical portion 51 and the magnetic head 6 is fitted to the end of this hemi-spherical portion 51. The other end of the movable member 5 is connected to load means (resilient biasing means) for pushing the movable member 5 towards the magnetic disk surface 100 and holding it. This load means is fitted to a support plate 10 which, in turn, is mounted on the back 7 of the slider 1 and seals the bore 4. In this embodiment, a coil spring 91 forms the load means. One of the ends of the coil spring 91 is connected to the support plate 10 and the other end to the movable member 5. In this embodiment, the load means functions also as inertia force cut-off means. The coil spring 91, acting as a load means, bears the weight of the magnetic head 6 and the movable member 5 and makes the contact surface pressure substantially zero in order to minimize the contact surface pressure of the magnetic head 6 on the magnetic disk 100. As explained with reference to FIG. 4 and as shown as FIG. 5, the slider 1 floats with a float distance h due to the very small air film between it and the surface of the magnetic disk 100. The cylindrical bore 4 is at the center in the transverse direction of the slider 1 and the movable member 5 is in the bore 4. The magnetic head 6 is at the free end of the hemi-spherical portion 51 at one end of the movable member 5 and the magnetic head 6 is in contact with the magnetic disk 100, exerting a very small contact surface pressure. As described above, the movable member 5 may be of magnetic material so that a separate magnetic head 6 is not needed.

Assuming that the contact surface pressure between the magnetic disk 100 and the magnetic head 6 is Pc, Pc is determined by the spring constant k of the coil spring 9 of the load means 9 and its deformation quantity (the difference of length between the natural length and the length at the time of setting) and expressed by the following formula:

$$Pc \, \alpha \, k \cdot x \qquad (5)$$

Therefore, Pc can be controlled by changing the spring constant k of the coil spring 91 and its deformation quantity x. In this embodiment, the coil spring 91 is set so that Pc is substantially 0 (zero).

Next, the operation of this embodiment and its effects will be explained.

Figure 6A:
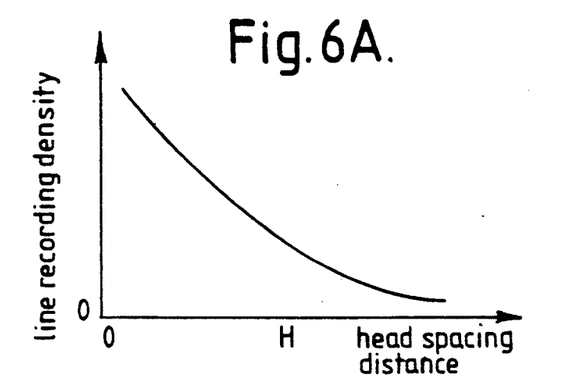
FIGS. 6a to 6b and 6c are diagrams illustrating characteristics of the slider.
Figure 6B:
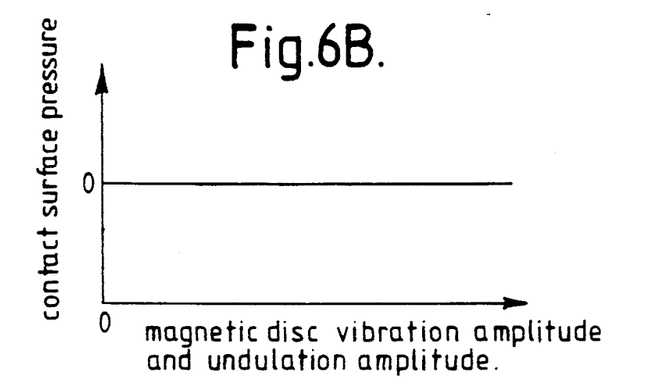

FIG. 6A shows a relationship between the spacing H of the magnetic head from the disk and the line recording density. As shown in FIG. 6A, it is well known that the line recording density can be improved by reducing the distance H. In order to make vertical magnetic recording which is expected to be predominant in future magnetic recording systems, it is believed necessary that the distance H be 0.1 μm or less. The present invention can improve drastically the line recording density and facilitates vertical magnetic recording by making the distance H substantially 0 μm. Incidentally, there is experimental evidence to show that the line recording density can be improved by ten times or more by contact recording. In this embodiment, the contact surface pressure Pc between the magnetic head and the magnetic disk can be made substantially zero without changing due to the vibration amplitude and swell amplitude of the magnetic disk (FIG. 6B).

Figure 6C:
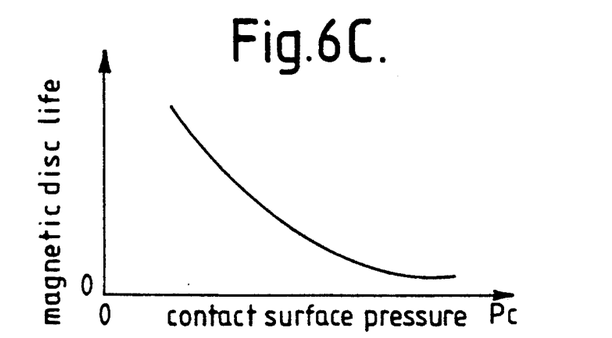

Accordingly, the life of the magnetic disk can be prolonged and reliability of the apparatus can be improved, as shown in FIG. 6C. In other words, the life of the magnetic disk drops remarkably if Pc becomes great. Therefore, the life of the magnetic disk can be prolonged by maintaining Pc small. In this manner, the magnetic disk apparatus can have a high line recording density (giving a large memory capacity, high reliability and a long life).

Next, the mechanism which can make Pc substantially zero (0) in the magnetic head slider in accordance with the present invention will be explained. One of the causes which changes greatly the Pc value is the variation of the magnetic disk generally perpendicular to its plane. This vibration can be classified broadly into first variations resulting from the surface shape of the surface of the magnetic disk, and second variations due to wind which is generated by the rotation of the magnetic disk, and third vibration due to vibration of the motor for rotating the magnetic disk. Variations resulting from the wind or the like have a relatively low frequency which the slider 1 can move to permit such variations. Variations of a high frequency due to, for example, undulation (coarseness) of the magnetic disk surface cannot be followed by the slider 1. First, low frequency disk vibration, which the slider 1 can follow, will be explained.

Figure 7A:
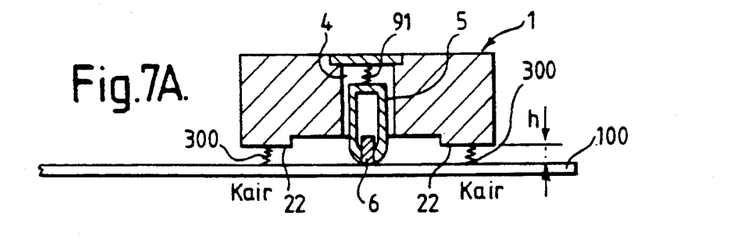
FIGS. 7a, 7b and 7c are explanatory views of the first embodiment of the present invention.
Figure 7B:
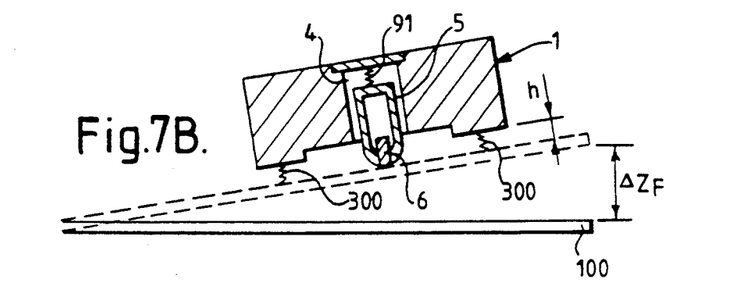

FIGS. 7a, 7b and 7c show a model of the magnetic disk vibration. The air film between the portion 22 of the float rails 2 of the slider 1 and the rotating magnetic disk 100 permits a very small gap (float distance) h therebetween. Since the air film has the property of a spring, it can be represented by an air spring 300. Here, the air spring 300 is shown in FIG. 7a with its spring constant being Kair. FIG. 7a shows the operation of the slider 1 when there is no vibration of the magnetic disk 100 perpendicular to its plane. Furthermore, when the magnetic disk 100 vibrates with amplitude $Z_F$ due to disturbance as shown in FIG. 7b, the slider 1 floats on the surface of the magnetic disk 100, and the float distance h is maintained by the air spring 300.

Accordingly, the contact surface pressure $P_c$ between the magnetic head 6 and the magnetic disk 100 can always be $P_c=0$ without being changed by the vibration of the magnetic disk 100.

In other words, even when the magnetic disk vibrates, the contact surface pressure $P_c$ does not change because x can be kept constant in Formula (5).

Figure 7C:
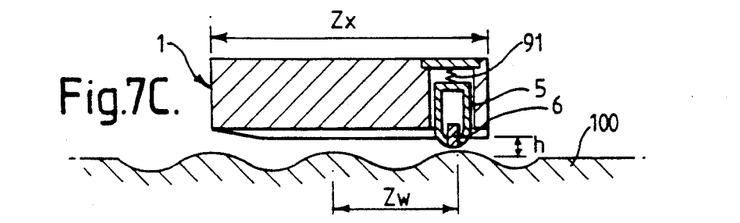

When a swell or undulation (surface coarseness) with a pitch $Z_w$ shorter than the length $Z_x$ of the slider 1 in the longitudinal direction exists on the surface of the magnetic disk as shown in FIG. 7c ($Z_w<Z_x$) the slider 1 cannot follow such a swell or undulation. However, the magnetic head 6 is much smaller than the slider 1 and is at the hemispherical end of the movable member 5. The mass of the magnetic head 6 and that of the movable member 5, to which the magnetic head 6 is mounted, are much smaller than that of the slider 1 and their inertial force is cut off by the coil spring 91. Hence, the coil spring 91 functions as the inertia force cut-off means. For the reasons described above, even when the swell or undulation (surface coarseness) exists on the surface of the magnetic disk 100 as shown in the drawing, the magnetic head 6 is not limited by the slider 1 but can freely move along the surface of the magnetic disk 100. The movable member 5 moves in the bore to compensate for the undulations.

Therefore, the contact surface pressure between the magnetic head 6 and the surface of the magnetic disk 100 can be kept constant irrespective of the coarseness (undulation, etc) of the magnetic disk 100. If the spring rigidity of the coil spring 91 is reduced, the contact surface pressure can be reduced and the inertia cut-off effect can be increased, but this reduction will depend on the force necessary to bias the magnetic head 6 onto the surface of the magnetic disk 100.

Furthermore, since the coil spring 91 functions also as the inertia force cut-off means of the movable member 5, the magnetic head 6 can move freely along the surface of the magnetic disk 100 without being restricted by the slider 1 when the magnetic head 6 comes into contact with the magnetic disk 100. Therefore, Pc can be made substantially zero (0) even when the magnetic disk 100 rotates at a high speed and vibrates.

When the mechanism described above is employed it becomes possible to bring only the magnetic head 6 close to, or into contact with, the surface of the magnetic disk 100 without the slider 1 approaching too close to the surface of the magnetic disk 100 (i.e. without reducing the float distance h). Thus, the slider 1 and the magnetic disk 100, each having masses greater than that of the magnetic head 6, do not come into mutual contact, which contact could damage the surface of the magnetic disk 100 and hence the data stored on the disk. This provides another advantage, in that machining of the slider 1 need not be of high precision. A conventional magnetic head is fixed to the slider and the slider must float with a predetermined float distance in order to keep the distance between the magnetic disk and the magnetic head within a predetermined range. Therefore, the conventional systems need a high machining accuracy for the machining of the float surface of the slider. If the magnetic head support mechanism of this embodiment is employed, however, the float distance of the slider 1 need not be controlled as closely as in the conventional systems and machining of the float surface of the slider 1 can be less precise.

If the mechanism described above is employed, it is unnecessary to provide means for controlling the position of the magnetic head 6, which have been necessary in prior art techniques. Hence, the magnetic head 6 can be contacted and supported stably with respect to the surface of the magnetic disk 100 and the support mechanism can be simplified.

Figure 8:
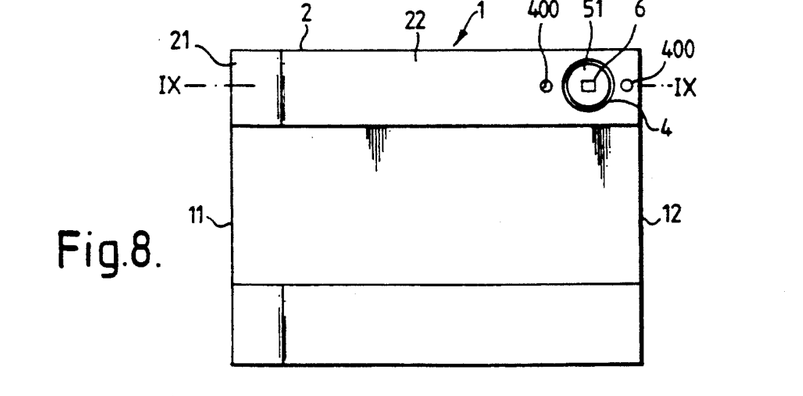
FIG. 8 is a front view of a magnetic head slider unit of a second embodiment of the present invention when viewed from the float surface.
Figure 9:
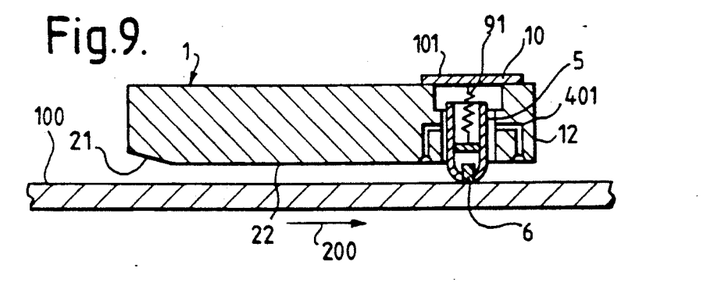
FIG. 9 is a sectional view taken along line IX—IX in FIG. 8.
Figure 10:
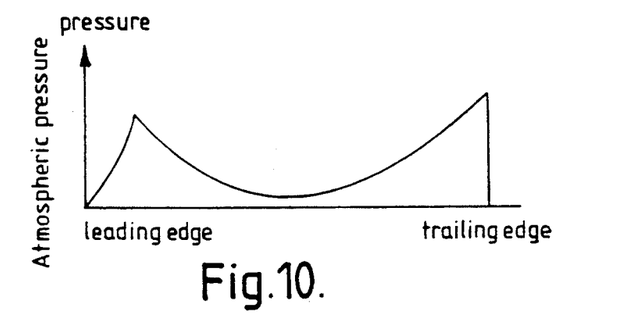
FIG. 10 is a diagram of pressure distribution diagram along the float surface.

Next, a second embodiment of the present invention will be described with reference to FIGS. 8, 9 and 10, with FIG. 9 illustrating the disk during operation of the slider, for example, the disk at the time of rotation.

This second embodiment is different from the first embodiment in that the bore 4 and the movable member 5 are in the flat surface portion 22 of the float rails 2. Furthermore, there are air intake ports 400 in the flat surface portion 22 and there are ducts 401 connecting the air intake ports 400 to the side wall of the bore 4. This arrangement enables the movable member 5 to move orthogonal to the magnetic disk surface. Thus, even if there is undulation (surface coarseness) in the surface of the magnetic disk 100, the magnetic head 6 can move smoothly and independently along the magnetic disk surface without being restricted by the slider 1, so that the change of the contact surface pressure Pc of the magnetic head 6 can be minimized.

The reason for this will now be explained with reference to FIGS. 9 and 10. A compressed air film is formed on the outer surface of the float rails 2 and it is well known that its pressure distribution has a saddle-like shape as shown in FIG. 10 (e.g. JSMA Papers (3rd Section) Vol. 11, No. 386, pp, 3594–3602). In other words, the points of maximum air pressure is near the intersection between the taper portion 21 and the flat surface portion 22 and near the trailing edge 12 of the flat surface portion 22. Accordingly, high pressure air, higher than the atmospheric pressure, is guided from the air intake ports 400 in the flat surface portion 22 adjacent the trailing edge 12 through the ducts 401 to the surface between the bore 4 and the movable member 5. For this reason, the high pressure air acts as an air bearing and assists in ensuring smooth movement of the movable member 5 inside the bore 4. The high pressure air guided into the bore 4 is released to the atmosphere through an exhaust port 101 in the support plate 10, sealing the end of the bore 4.

As described above, since this embodiment permits the movable member 5 to move smoothly inside the bore 4, the change of $P_c$ due to the change of the float distance h of the slider 1 can be minimized. Other effects, achievable by the first embodiment, for example, extension of the life of the magnetic disk and increase in the memory capacity of the magnetic disk apparatus by increasing the line recording density, can also be expected for this embodiment.

Hence, stable contact between the magnetic head 6 and the magnetic disk 100 can be accomplished without disposing means for controlling the position of the magnetic head. Furthermore, the contact surface pressure can be kept small without vibration of the magnetic disk or undulation (surface coarseness). Since the magnetic head 6 and the slider 1 can be positioned independently of each other, the float distance of the slider 1 need not be reduced excessively high and machining accuracy is not needed. Furthermore, the possibility of contact between the slider 1 and the disk is reduced. Also, as described already, a separate movable member 5 and magnetic head 6 is not needed if the movable member and the magnetic head 6 are integral.

Figure 11:
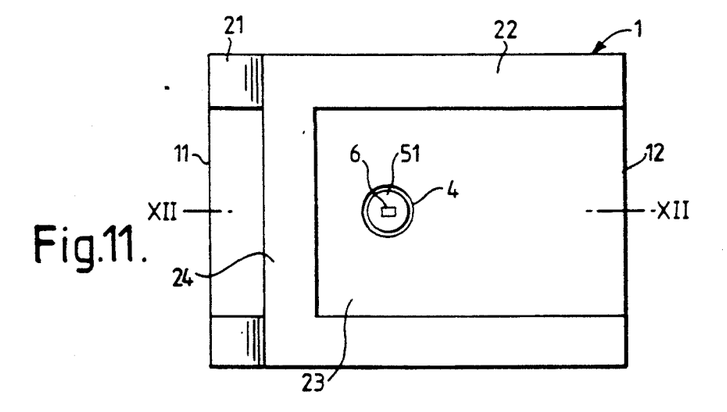
FIG. 11 is a front view of a magnetic head slider unit of a third embodiment of the present invention, when viewed from the float surface.
Figure 12:
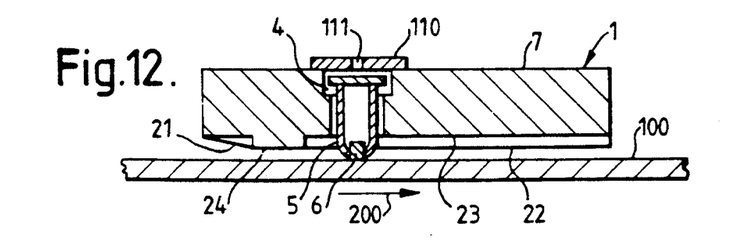
FIG. 12 is a sectional view taken along the line XII—XII in FIG. 11.
Figure 13:
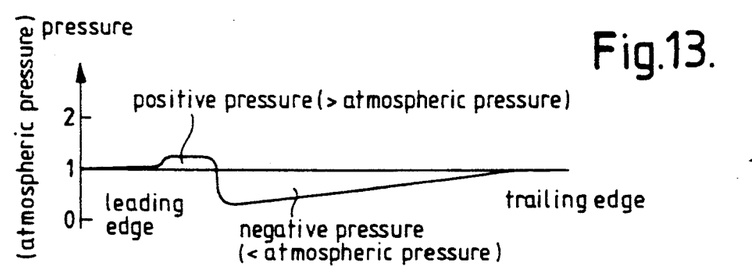
FIG. 13 is a pressure distribution diagram taken along the line XII—XII in FIG. 11.

The third embodiment of FIGS. 11-13 differs from the first embodiment in that the bore 4 and the movable member 5 to which and the magnetic head 6 is mounted are in a "negative pressure" generation portion 23. A pressure which is lower than the atmospheric (ambient) pressure is called a "negative pressure"; and the pressure distribution of the negative pressure generation portion 23 is lower than the atmospheric pressure (1 atm) as shown in FIG. 13.

This negative pressure generation mechanism and the shape for generating the negative pressure will not be described in detail because they are described, for example, in U.S. Pat. No. 3,855,625, Japanese Patent Laid-Open No. 64670/1983, Japanese Patent Laid-Open No. 210479/1982, and Japanese Patent Publication No. 18780/1984. However, it is well known that a negative pressure develops when the sectional area of a flow path increases suddenly. The negative pressure region 23 in this embodiment is formed by a planar part which is somewhat closer to the back 7 of the slider 1 (by at least several microns) than the flat surface portion 22 of the rails 2. Immediately in front (for example, towards the leading edge of the slider 1) of the negative pressure region 23 is a transverse bar 24, with a height similar to the rails 22, so that the flow path increases suddenly after the bar 24.

By this embodiment, if the movable member 5 supporting the magnetic head 6 and the bore 4 are in the negative pressure region 23, load means for pushing the movable member 5 towards the magnetic disk 100 are unnecessary. Thus, the coil spring 91 that is necessary in the first embodiment becomes unnecessary in this embodiment. The magnetic head 6 in the negative pressure region 23 is attracted towards the magnetic disk 100 due to the pressure difference between the back 7 of the slider 1 and the negative pressure region 23. Air at atmospheric pressure flows into the bore 4 from a cover air intake port 111 in a cover 110 covering the bore 4. The air passes through the bore 4 and is guided to the negative pressure generation portion 23. Consequently, the movable member 5 is biased towards the negative pressure region 23, for example, towards the magnetic disk 100. For this reason, the coil spring 91 that is necessary in the first embodiment is unnecessary. In this embodiment, the air inside the bore 4 functions also as an inertial force cut-off means. The movable member 5 moves and slides along the inner wall of the bore 4. The same advantages as those of the first embodiment can also be expected of this embodiment.

Figure 14:
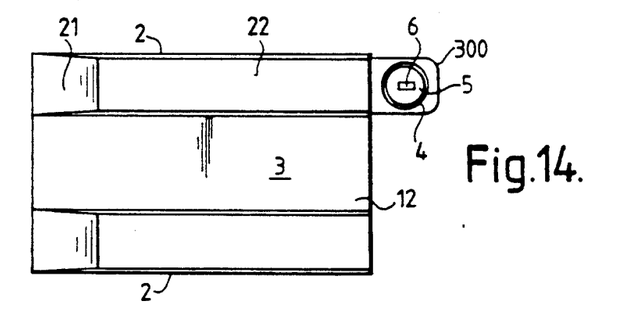
FIG. 14 is a plan view of a magnetic head slider unit according to a fourth embodiment of the present invention when viewed from the float surface.
Figure 15:
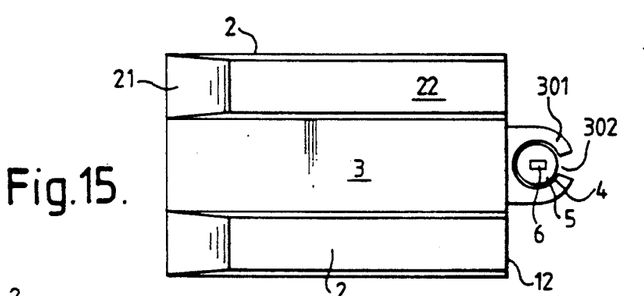
FIG. 15 is a plan view of a magnetic head slider unit according to a fifth embodiment of the present invention when viewed from the float surface.
Figure 16:
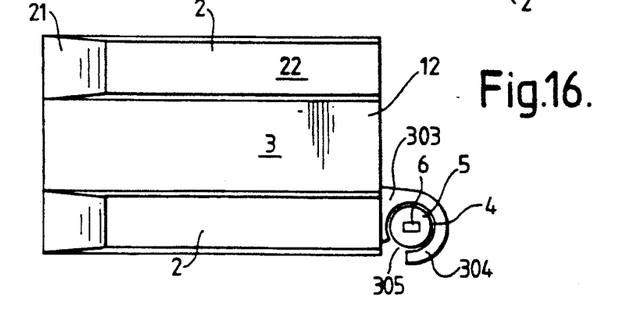
FIG. 16 is a plan view of a magnetic head slider unit according to a sixth embodiment of the present invention when viewed from that surface.

In the first to third embodiments described above the bore 4 containing the movable member 5 is in the float surface of the slider 1. This is not essential, however, and the bore may be in a separate holder part of the slider 1. FIGS. 14 to 16 illustrate fourth to sixth embodiments of the present invention in which such a holder is used.

In the fourth embodiment, shown in FIG. 14, a holder 300 is mounted on the trailing edge 12 of the slider by a suitable bond. The bore 4 is then formed in the holder 300. As illustrated in FIG. 14, the holder 300 is aligned with one of the rails 2, but could also be aligned with the bleed surface 3.

In FIG. 14, the holder 300 completely encircles the movable member 5. However, in the fifth embodiment, shown in FIG. 15, the holder 301 may have a gap 302 therein provided the gap 302 is not so large as to allow the movable member to be released. The bore 4 is then formed in the holder 301 and the gap 302 extends thereto.

FIG. 16 shows a sixth embodiment in which the holder 303 has a resilient arm 304 which extends substantially around the movable member. The resilience of the arm permits the gap 305 to be widened to allow the movable member 5 to be inserted or released from the bore 4 if desired.

Figure 17:
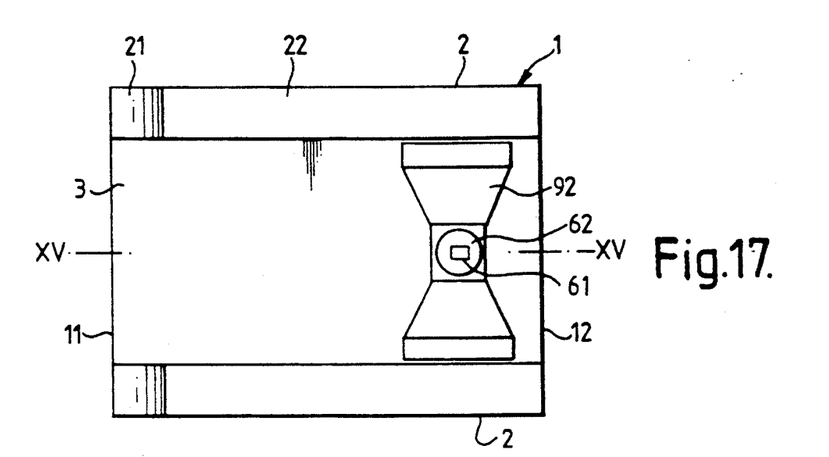
FIG. 17 is a front view of the magnetic head slider of a seventh embodiment of the present invention when viewed from the float surface.
Figure 18:
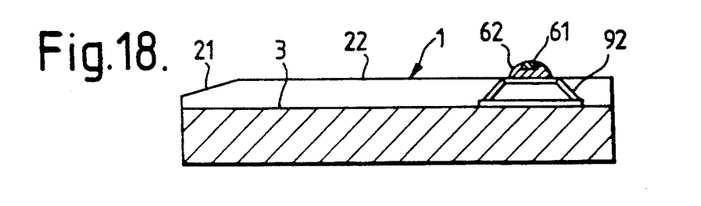
FIG. 18 is a sectional view taken along the line XV—XV in FIG. 17.
Figure 19:
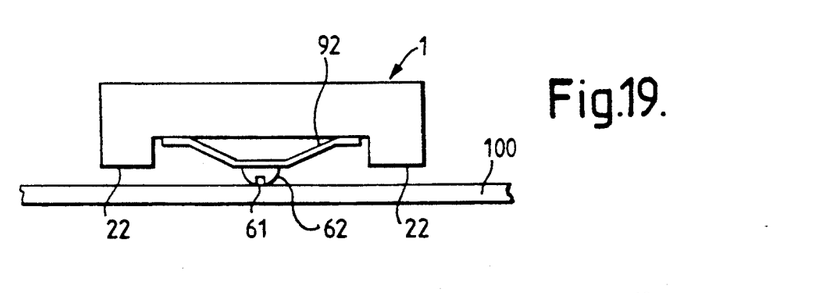
FIG. 19 is an explanatory view of the operation of the slider of FIG. 17.

Next, a seventh embodiment of the present invention will be described with reference to FIGS. 17 to 19.

In the first six embodiments, the magnetic head 6 is mounted on a movable member 5 which is movable on a bore 4. In the seventh embodiment, however, the magnetic head 61 is mounted on a domed surface 62 which is, in turn, mounted on an intermediate part of a flexible member 92, which flexible member 92 has its ends secured to the bleed surface 3 of the slider 1. The flexible member 92 is in the form of a leaf spring, so that its intermediate part is held spaced from the bleed surface 3, as can be seen from FIG. 19.

The leaf spring 92 generates a very small load force for pushing the magnetic head 62 towards the magnetic disk 100, enables the magnetic head 62 and the magnetic disk 100 to come into mutual contact with a very small contact force Pc and also enables the magnetic head 62 to move in a direction substantially vertical to the float surface of the slider 1. In this embodiment, the leaf spring 92 functions also as the inertia force cut-off means. Therefore, the same effect as that of the first embodiment can be expected in this embodiment and at the same time, improvement in production can be realized because the production becomes easier.

Lateral movement is prevented however, in this embodiment, by the leaf spring 92 functions also as an inertial force cut-off means. Therefore, at least some of the advantages of the first embodiment can be expected in this embodiment, with this embodiment being easier to produce.

Figure 20:
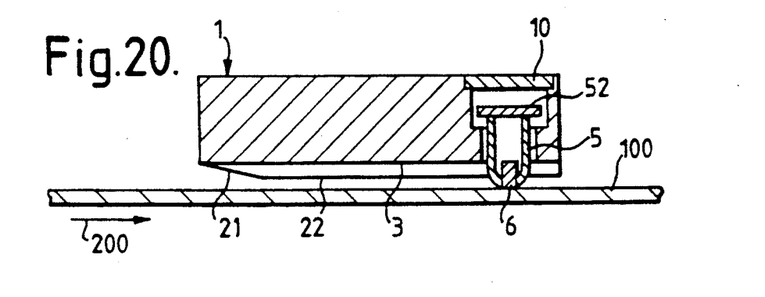
FIG. 20 is a sectional view of a magnetic head slider unit of an eighth embodiment of the present invention along the center line in the transverse direction.

The difference between the eighth embodiment of FIG. 20 and the first embodiment is that there is no coil spring 91 acting as a load means. Therefore, the self-weight of the movable member 5 itself controls the contact surface pressure Pc between the magnetic head 6 and the magnetic disk 100. Since the coil spring 91 can thus be eliminated, number of components thus be reduced, production can be improved. Furthermore, the movable member 5 is slidable and movable in the inner wall of the bore 4.

Therefore, the inertial force is cut off between the magnetic head 6 and the slider 1. Due to the functions described above, the same effect as that of the first embodiment can be expected. In this embodiment, there is a stopper 52 for preventing the movable member falling out of the bore 4 at the end of the movable member 5 remote from the magnetic head 6.

Figure 21:
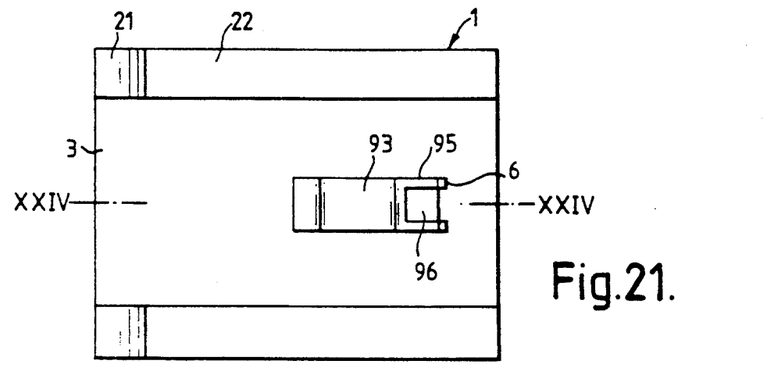
FIG. 21 is a front view of a magnetic head slider unit of a ninth embodiment of the present invention when viewed from the float surface.
Figure 22:
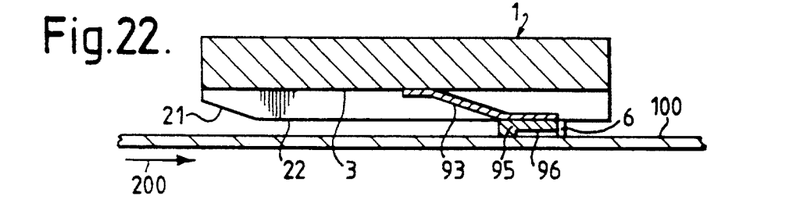
FIG. 22 is a sectional view taken along the line XXIV—XXIV in FIG. 23.

In the ninth embodiment of FIGS. 21 and 22, the magnetic head 6 is mounted on a flexible member, and in this respect this embodiment is similar to the seventh embodiment. However, the flexible member is in the form of a cantilever arm 93 extending outwardly of the bleed surface 13. One end of the arm 93 is attached to the bleed surface 3 and the head is at the free end of the arm 93.

Furthermore, there is a negative pressure generation member 95 at the free end of the cantilever arm 93 where the magnetic head 6 is attached. The negative pressure generation member generates a force attracting the magnetic head to the magnetic disk 100. The negative pressure generation member 95 generates a negative pressure (a pressure lower than the atmospheric pressure) between it and the moving magnetic disk 100, is attracted to the magnetic disk surface 100, and contacts the magnetic disk 100 together with the magnetic head 6, and there is a very small contact force. Therefore, the magnetic head 6 ca be stably brought into contact with the magnetic disk 100 and with a very small contact force. The negative pressure generation member 95 shown in this embodiment is formed by providing a recess 96 which generates negative pressure due to the sudden widening of the air flow path. This effect is disclosed in many references such as, for example, U.S. Pat. No. 3,855,625 and is not therefore explained here. Though this embodiment shows the negative pressure generation member 95 having the recess 96, the negative pressure generation member 95 may have any suitable shape. The suction means need not always be the negative pressure generation member 95 but may be any type so long as it sucks the magnetic disk 100 and comes into contact with it.

Figure 23:
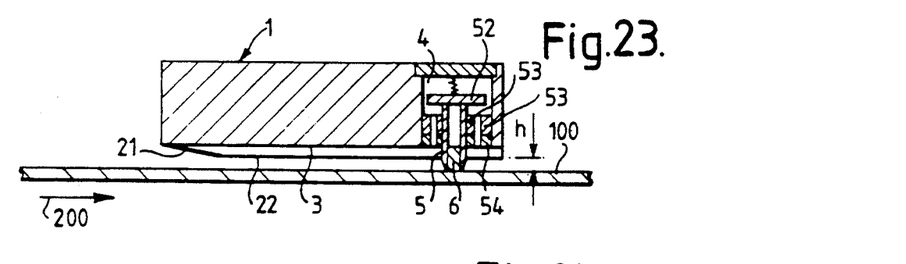
FIG. 23 is a sectional view of a magnetic head slider unit of a tenth embodiment of the present invention along the center line in the transverse direction.

The tenth embodiment of FIG. 23 differs from the first embodiment in that magnets 53 that have the same polarity (for example, are repulsive) are located on the outer periphery of the bore 4. The magnets 53 thus face each other. There is a magnetic shield 54 at the end of the bore 4 closest to the magnetic disk 100 in order to prevent magnetic leakage of the magnet 53. In this manner, sliding motion between the movable member 5 and the inner wall of the bore is smooth and the magnetic head can move smoothly and substantially orthogonally, to the flat surface portion 22 of the float surface. Thus, even if the float distance h changes for some reason or if there is any undulation (surface coarseness) on the magnetic disk surface, the magnetic head 6 moves smoothly and the change of the contact surface pressure Pc can be minimized. This embodiment uses magnets 53, but static electricity can also be used to generate a repulsive force between the walls of the bore 4 and the movable member 5.

Figure 24:
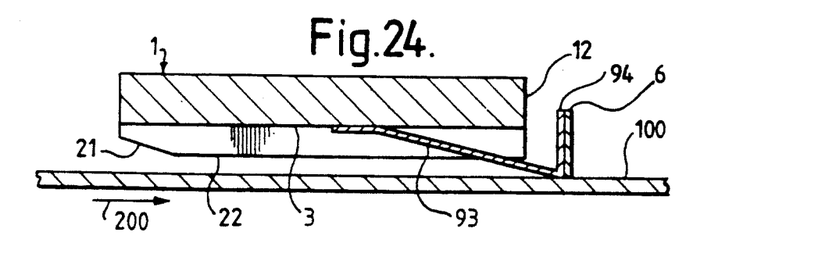
FIG. 24 is a sectional view of a magnetic head slider unit of an eleventh embodiment of the present invention along the center line in the transverse direction.

In the eleventh embodiment of FIG. 24, the magnetic head 6 is mounted on a cantilever arm 93, as in the embodiment of FIGS. 21 and 22. However, in this embodiment the arm 93 extends rearwardly beyond the trailing edge 12 of the slider 1 and there is a magnetic head fitting plate 94 at the free end of the arm 93.

In the embodiment of FIGS. 21 and 22, the size of the magnetic head 6 must be limited to a size less than the gap between the magnetic disk 100 and the bleed surface 3 of the slider 1. If the construction of this embodiment is used, however, limitations on the size of the magnetic head 6 are eliminated and production is easier.

Since the present invention has the construction described above, it may provide the following effects.

Since the magnetic head is fitted so as to extend from the float surface of the slider towards the magnetic disk surface there is suitable inertial force cut-off means (for example, the use of a cantilever arm or movable member) between the magnetic head and the slider, the contact surface pressure between the magnetic and the magnetic disk at a very small predetermined pressure irrespective of disk vibration and surface coarseness.

Accordingly, it is possible to improve the recording density and at the same time, since durability of performance of the disk can be improved, an apparatus having a large capacity and high reliability may be provided.

Since the magnetic head and the slider are slidable the effect of cutting off the inertial force between the magnetic disk and the slider can be expected. Furthermore, positioning of the magnetic head can be made independently of the slider and the slider need not be brought close to the magnetic disk surface. Since contact between the slider and the magnetic disk can -thus be avoided, the recorded data will not be destroyed. Since the float distance of the slider need not be closely controlled there is no need for machining and assembly of very high accuracy and production can be improved.

Since there may be suitable load means for applying the load in a direction for bringing the magnetic head into contact with the magnetic disk surface the contact surface pressure between the magnetic head and the magnetic disk can be controlled. If a flexible coil spring is used for this load means, it can be used also as the inertial cut-off means. Thus, stable contact can be accomplished between the magnetic disk and the magnetic head without requiring specific operations means for controlling the position of the magnetic head. Accordingly, the mechanism can be simplified and reliability can be improved.

The use of a bore perpendicular to the float surface may be combined with the formation of a negative pressure region adjacent the slider and the magnetic head ma then be located in this bore. Then it is unnecessary to have the load means described above.

Normally, the bore perpendicular to the float surface is in a positive pressure portion of the slider and the magnetic head is disposed in this bore. An air duct may be provided so as to introduce high pressure air generated adjacent the float surface to the slide between the inner wall of the bore and the movable member. In this manner sliding motion of the movable member in the bore can be made smooth.

Contact between the magnetic head and the disk surface may be stable irrespective of surface coarseness of the disk surface by making the magnetic head or the part of the movable member supporting the head to be hemi-spherical.

What is claimed is:

1. A magnetic head slider unit comprising:
    a slider having a float surface for generating buoyancy and forming an air film between said float surface and a surface of a magnetic member, said slider having a bore extending into said slider along a predefined axis; and
    a movable member mounted in said bore so that a part thereof projects from a level of said float surface toward said magnetic member and a further part is held by an inner wall of said bore, said movable member being freely movable only axially in said bore slidable along the inner wall of said bore and restricted of lateral movement thereof by substantially only the inner wall of said bore, at least some of said part of said movable member projecting from the level of said float surface toward said magnetic member being of magnetic material and forming a magnetic head for reading or writing data stored magnetically on said magnetic member.

2. A magnetic head slider unit according to claim 1, wherein said bore is in said float surface.

3. A magnetic head slider unit according to claim 1, further comprising a holder for said movable member, said holder being adjacent said float surface and defining said bore.

4. A magnetic head slider unit according to claim 1, further comprising resilient biasing means in said bore for biasing said movable member in an axial direction of said said bore so as to bring said movable member into contact with said magnetic member.

5. A magnetic head slider unit according to claim 1, further comprising at least one through duct in said slider extending between said float surface and said bore for conducting air from adjacent said float surface to the interior of said bore.

6. A magnetic head slider unit according to claim 1, wherein said slider includes air pressure variation means for varying the air pressure adjacent thereto so as to reduce the air pressure, said air pressure variation means being mounted adjacent said bore so that the reduced air pressure generates an attractive force between said movable member and said magnetic member.

7. A magnetic head slider unit according to claim 1, wherein a first magnet is mounted on the inner wall of said bore, and a second magnet is mounted on said further part of the movable member, said first and second magnets being arranged to generate a repulsive force therebetween.

8. A magnetic head slider unit according to claim 1, wherein said slider comprises a pair of parallel slide rails defining said float surface, and wherein a recessed bleed surface is provided between said slide rails.

9. A magnetic head slider unit according to claim 8, wherein said bore is disposed in said bleed surface.

10. A magnetic head slider unit according to claim 1, wherein said movable member is fashioned of a magnetic material.

11. A magnetic head slider unit according to claim 1, wherein an axis of said bore is perpendicular to said float surface.

12. A magnetic head slider unit according to claim 1, wherein the end of said movable member at a side of said magnetic member is hemispherically shaped, and wherein said magnetic head is provided in the hemispherically shaped end.

13. A magnetic head slider unit according to claim 1, wherein said magnetic head is in constant contact with said magnetic member during operation.

14. A magnetic head slider unit according to claim 1, further comprising inertia force cut-off means for cutting off an inertia force of said movable member including said magnetic head from said slider.

15. A magnetic head slider unit comprising:
a slider having a float surface for generating buoyancy and forming an air film between said float surface and a surface of a magnetic member, and a bleed surface having a greater spacing from said magnetic member than said float surface;
a flexible member being elongate and attached to said slider at ends thereof and having an intermediate part projecting from said bleed surface toward said magnetic member; and
a magnetic head mounted on said intermediate part of said flexible member so as to be spaced from said float surface and in use, in contact with said magnetic member, said magnetic head being of a magnetic material for forming a magnetic head for reading or writing data stored magnetically on said magnetic member.

16. A magnetic head slider unit according to claim 15, wherein said slider includes a pair of parallel slide rails defining said float surface, and wherein a recessed bleed surface is formed between said slider rail.

17. A magnetic head slider unit according to claim 16, wherein said flexible member is secured to said bleed surface.

18. A magnetic head slider unit according to claim 15, wherein said intermediate part of said flexible member has a hemispherical portion, and wherein said magnetic head is formed on said hemispherical portion.

19. A magnetic head slider unit according to claim 18, wherein said flexible member is elongated in a direction traversing a moving direction of said magnetic member.

20. A magnetic disk apparatus comprising:
a magnetic head slider unit including: a slider having a float surface for generating buoyancy and forming an air film between said float surface and a surface of a magnetic member, a bleed surface, a flexible member extending from said bleed surface toward said magnetic member, a magnetic head mounted on said flexible member so as to be spaced from said float surface, said magnetic head being of a magnetic material for forming a magnetic head for reading or writing data stored magnetically on said magnetic member, and
air pressure variation means provided on said flexible member for varying the air pressure adjacent thereto so as to reduce the air pressure, said air pressure variation means being mounted adjacent said magnetic head so that the reduced air pressure generates an attractive force between said magnetic head and said magnetic member;
a magnetic disk forming said magnetic member; and
means for supporting said magnetic head slider unit above said disk such that said magnetic head slider unit is movable relative to said disk adjacent a surface of the disk with said float surface spaced from the adjacent surface of the disk and the magnetic head being in contact with that surface.

21. A magnetic disk apparatus comprising:
a magnetic head slider unit including a slider having a float surface for generating buoyancy and forming an air film between said float surface and a surface of a magnetic member, and a bleed surface spaced further from said magnetic member than said float surface, a flexible member being elongate and attached to said slider at ends thereof and having an intermediate part extending from said bleed surface toward said magnetic member, and a magnetic head mounted on said intermediate part of said flexible member so as to be spaced from said float surface and, in use, in contact with said magnetic member, said magnetic head being of a magnetic material for forming a magnetic head for reading or writing data stored magnetically on said magnetic member;
a magnetic disk forming said magnetic member; and
means for supporting said magnetic head slider unit above said disk such that said magnetic head slider unit is movable relative to said disk adjacent a surface of the disk with said float surface spaced from the adjacent surface of the disk and the magnetic head being in contact with that surface.

22. A magnetic head slider unit according to claim 21, wherein said intermediate part of said flexible member has a hemispherical portion, and wherein said magnetic head is formed on said hemispherical portion.

23. A magnetic disk apparatus comprising:
a magnetic head slider unit including a slider having a float surface for generating buoyancy and forming an air film between said float surface and a surface of a magnetic member, said slider having a bore extending into said slider along a predefined axis, and a movable member mounted in said bore so that a part thereof projects from a level of said float surface toward said magnetic member and a further part is held by an inner wall of said bore, said movable member being axially movable in said bore and slidable along the inner wall of said bore, at least some of said part of said movable member projecting from the level of said float surface toward said magnetic member being of magnetic material and forming a magnetic head for reading or writing data stored magnetically on said magnetic member;
a magnetic disk forming said magnetic member; and
means for supporting said magnetic head slider unit above said disk such that said magnetic head slider unit is movable relative to said disk adjacent a surface of the disk with said float surface spaced from the adjacent surface of the disk and the magnetic head being in contact with that surface during operation.

24. A magnetic head slider unit according to claim 23, wherein the end of said movable member at a side of said magnetic member is hemispherically shaped and wherein said magnetic head is provided in the hemispherically shaped end.

25. A magnetic disk apparatus comprising:
a magnetic head slider unit including a slider having a float surface for generating buoyancy and forming an air film between said float surface and a surface of a magnetic member and a bleed surface, a flexible member extending from said bleed surface toward said magnetic member and extending beyond said float surface, in plan view, a magnetic head mounted on a part of said flexible member beyond said float surface so as to be spaced from said float surface and, in use, in contact with said magnetic member, said magnetic head being of magnetic material for forming a magnetic head for reading or writing data stored magnetically on said magnetic member;
a magnetic disk forming said magnetic member; and
means for supporting said magnetic head slider unit above said disk such that said magnetic head slider unit is movable relative to said disk adjacent a surface of the disk with said float surface spaced from the adjacent surface of the disk and the magnetic head being in contact with that surface.

26. A magnetic head slider unit comprising:
a slider having a float surface for generating buoyancy and forming an air film between said float surface and a surface of a magnetic member, and a bleed surface having a greater space from said magnetic member than said float surface;
a flexible member mounted on said bleed surface so as to extend toward said magnetic member;
a magnetic head mounted on said flexible member so as to be spaced from said float surface and in contact with said magnetic member, said magnetic head being of a magnetic material for forming a magnetic head for reading or writing data stored magnetically on said magnetic member; and
air pressure variation means provided on said flexible member for varying the air pressure adjacent thereto so as to reduce the air pressure, said air pressure variation means being mounted adjacent said magnetic head so that the reduced air pressure generates an attractive force between said magnetic head and said magnetic member.

27. A magnetic head slider unit comprising:
a slider having a float surface for generating buoyancy and forming an air film between said float surface and a surface of a magnetic member, and a bleed surface spaced from said float surface;
a flexible member mounted on said slider so as to extend from said bleed surface toward said magnetic member and extend beyond a trailing end of said slider, in a plan view;
a magnetic head mounted on a part of said flexible member beyond said float surface so as to be spaced from said float surface and, in use, in contact with said magnetic member, said magnetic head being of a magnetic material for forming a magnetic head for reading or writing data stored magnetically on said magnetic member.

28. A magnetic head slider unit according to claim 27, wherein said flexible member includes air pressure variation means for varying the air pressure adjacent thereto so as to reduce the air pressure, said air pressure variation means being mounted adjacent said magnetic head, whereby the reduced air pressure generates an attractive force between said magnetic head and said magnetic member.

* * * * *